(12) United States Patent
Bacon et al.

(10) Patent No.: US 11,598,133 B2
(45) Date of Patent: Mar. 7, 2023

(54) SELF-ALIGNING DOOR BOGIE

(71) Applicant: Bell Textron Inc., Fort Worth, TX (US)

(72) Inventors: Bruce Bennett Bacon, Euless, TX (US); Bart Marcus Shafer, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 455 days.

(21) Appl. No.: 16/795,803

(22) Filed: Feb. 20, 2020

(65) Prior Publication Data

US 2021/0262264 A1   Aug. 26, 2021

(51) Int. Cl.
| E05D 15/10 | (2006.01) |
| B64C 29/00 | (2006.01) |
| B64D 29/06 | (2006.01) |

(52) U.S. Cl.
CPC ...... *E05D 15/1047* (2013.01); *B64C 29/0033* (2013.01); *B64D 29/06* (2013.01); *E05D 2015/1055* (2013.01); *E05Y 2201/684* (2013.01); *E05Y 2201/688* (2013.01); *E05Y 2900/502* (2013.01)

(58) Field of Classification Search
CPC ............. B64D 29/06; E05D 15/1047; E05D 2015/1055; E05D 15/0652
See application file for complete search history.

(56) References Cited

U.S. PATENT DOCUMENTS

| 6,209,171 B1* | 4/2001 | Pelletier .................. E05D 15/08 403/374.5 |
| 9,174,731 B2 | 11/2015 | Ross et al. |
| 2018/0252263 A1 | 9/2018 | Pravanh et al. |
| 2018/0252264 A1* | 9/2018 | Pravanh ................ F16C 29/002 |

FOREIGN PATENT DOCUMENTS

| DE | 841710 C | 6/1952 |
| DE | 19601287 A1 | 7/1997 |
| EP | 2586945 A1 | 5/2013 |

\* cited by examiner

*Primary Examiner* — Tien Q Dinh
*Assistant Examiner* — William L Gmoser
(74) *Attorney, Agent, or Firm* — Shackelford, Bowen, McKinley & Norton, LLP

(57) ABSTRACT

A door roller includes a carriage member comprising a plurality of bores, and a plurality of roller assemblies connected to the carriage member, each roller assembly of the plurality of roller assemblies including a pivot bearing rotatably disposed within a bore of the plurality of bores and a pair of rollers coupled to the pivot bearing. Each wheel assembly is configured to pivot relative to the carriage member.

20 Claims, 10 Drawing Sheets

SELF-ALIGNING DOOR BOGIE

TECHNICAL FIELD

The present disclosure relates to an aircraft, and more particularly, to a tiltrotor aircraft having a door roller mechanism for cooperation with a roller track assembly for securing a movable proprotor gearbox door during aircraft operation.

BACKGROUND

This section provides background information to facilitate a better understanding of the various aspects of the disclosure. It should be understood that the statements in this section of this document are to be read in this light, and not as admissions of prior art.

Certain tiltrotor aircraft, such as the Bell Helicopter Valor V-280 tiltrotor aircraft, employ a nacelle propulsion system on a wing member with a fixed portion that encloses an engine and a movable (rotatable) proprotor gearbox (PRGB) system that drives the rotor blades. The PRGB system is rotatable relative to the fixed portion of the nacelle to convert between a vertical flight mode and a forward flight mode and vice versa. A PRGB door is connected at one end to the PRGB system by one or more hinge fittings that permit rotation thereof and is connected at another end to a door roller mechanism (sometimes called a door bogie) and roller track assembly in a manner that the PRGB door moves between closed and open positions in response to rotation of the movable PRGB system. U.S. Patent Publication No. 2018/0252263 discloses such a prior roller track system and is incorporated herein by reference.

In operation of such tiltrotor aircraft, down wash from the rotors in the vertical flight mode, or in a conversion mode, as well as vibrations transmitted from the PRGB can cause unwanted lateral vibrations and movement of the PRGB door. In some instances, the forces acting upon the door bogie cause the door bogie to pitch or lean in such a way that can cause accelerated wear to the roller track assembly.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An example of a door roller includes a carriage member comprising a plurality of bores, and a plurality of roller assemblies connected to the carriage member, each roller assembly of the plurality of roller assemblies including a pivot bearing rotatably disposed within a bore of the plurality of bores and a pair of rollers coupled to the pivot bearing. Each wheel assembly is configured to pivot relative to the carriage member.

An example of a door roller includes a carriage member comprising a plurality of roller assemblies. Each roller assembly of the plurality of roller assemblies includes a pivot bearing rotatably disposed within a bore of the carriage member, a pair of shafts attached to the pivot bearing at a first end of each shaft of the pair of shafts, each shaft of the pair of shafts extending through a slot formed through the carriage member, and a roller attached to a second end of each shaft of the pair of shafts.

An example of a proprotor aircraft includes a rotatable proprotor gearbox, a proprotor gearbox door secured at one end of the proprotor gearbox door to a proprotor gearbox housing and at a second end to a roller track by a door roller. The door roller includes a carriage member comprising a plurality of roller assemblies. Each roller assembly of the plurality of roller assemblies includes a pivot bearing rotatably disposed within a bore of the carriage member, a pair of shafts attached to the pivot bearing at a first end of each shaft of the pair of shafts, each shaft of the pair of shafts extending through a slot formed through the carriage member, and a roller attached to a second end of each shaft of the pair of shafts.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
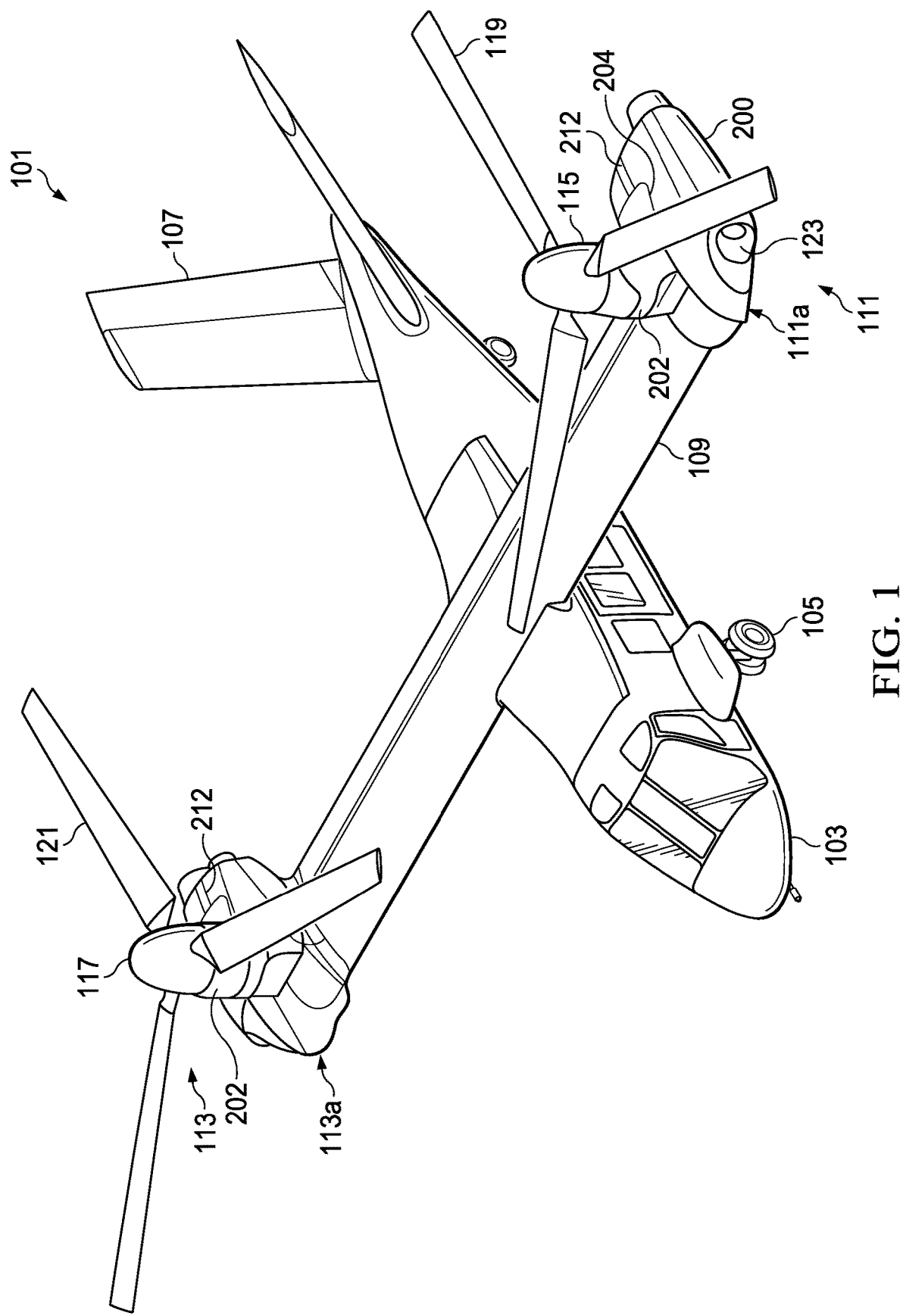
FIG. 1 is a perspective view of a tiltrotor aircraft in the vertical flight mode (helicopter mode), according to aspects of the disclosure.

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
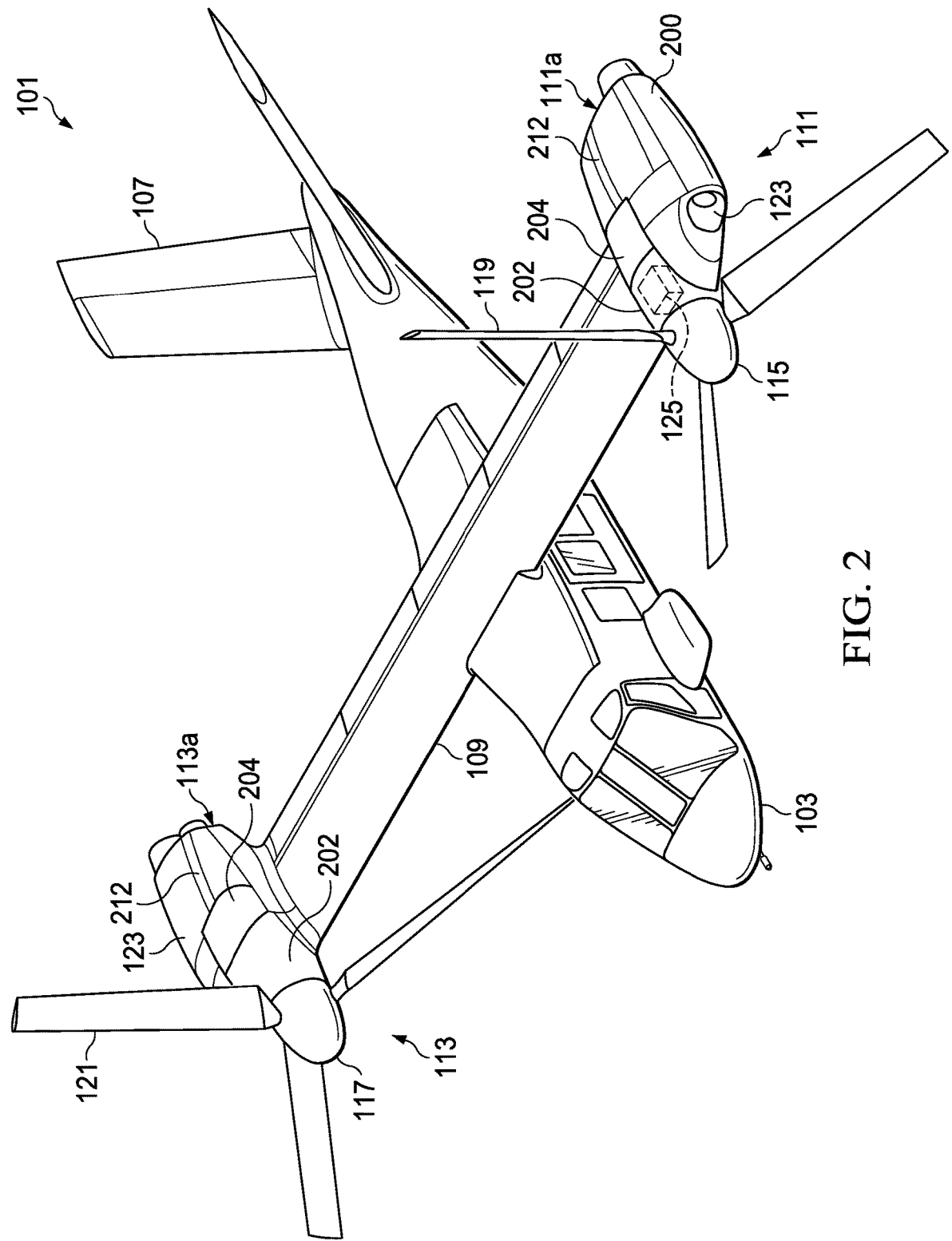
FIG. 2 is a perspective view of a tiltrotor aircraft in the forward flight mode (airplane mode), according to aspects of the disclosure.

FIG. 1 illustrates a tiltrotor aircraft 101 in the vertical flight mode (helicopter mode), in which rotatable proprotor gearbox systems 115, 117 are positioned substantially vertical to provide a lifting thrust. FIG. 2 illustrates tiltrotor aircraft 101 in a forward flight mode (airplane mode), in which rotatable proprotor gearbox systems 115, 117 are positioned substantially horizontal to provide a forward thrust in which a lifting force is supplied by a wing member 109. It should be appreciated that tiltrotor aircraft 101 can be operated such that rotatable proprotor gearbox systems 115, 117 are selectively positioned between the airplane mode and the helicopter mode, which can be referred to as a conversion mode.

Tiltrotor aircraft 101 includes a fuselage 103, a landing gear 105, a tail member 107 and propulsion systems 111, 113. Propulsion system 113 is substantially the same as propulsion system 111. For the sake of efficiency certain features will be disclosed only with regard to propulsion system 111. However, one of ordinary skill in the art would fully appreciate an understanding of propulsion system 113 based upon the disclosure herein of propulsion system 111. Further, propulsion systems 111, 113 are illustrated in the context of tiltrotor aircraft 101; however, propulsion systems 111, 113 can be implemented on other tiltrotor aircraft. For example, an alternative embodiment may include a quad tiltrotor that has an additional wing member aft of wing member 109. The additional wing member can have additional propulsion systems similar to propulsion systems 111, 113. In another embodiment, propulsion systems 111, 113 can be used with an unmanned version of tiltrotor aircraft 101. Further, propulsion systems 111, 113 can be integrated into a variety of tiltrotor configurations.

In the illustrated embodiments, each propulsion system 111, 113 includes a nacelle 111a, 113a, respectively, that houses an engine 123 that is fixed relative to wing member 109. Each propulsion system 111, 113 also includes a power transmission system that includes a proprotor gearbox (PRGB) 125 that drives rotor blades 119, 121. U.S. Pat. No. 9,174,731 provides further description of such a gearbox, the entire content of which is hereby incorporated by reference.

Each nacelle 111a, 113a includes a fixed portion 200 (fixed relative to wing member 109) and a movable proprotor housing 202 at each of the respective outboard ends of wing member 109. Fixed portion 200 encloses engine 123, such as for example a turbine engine, and parts of a torque transfer mechanism that provides power to the proprotor gearbox (PRGB) 125 (see FIG. 2) that is enclosed within movable proprotor housing 202. Movable proprotor housing 202 rotates relative to fixed portion 200 as tiltrotor aircraft 101 transitions between the forward flight mode (e.g., see FIG. 2) and the vertical flight mode (e.g., see FIG. 1). Rotor blades 119, 121 are driven by an output shaft of the PRGB as described in aforementioned U.S. Pat. No. 9,174,731.

Figure 3:
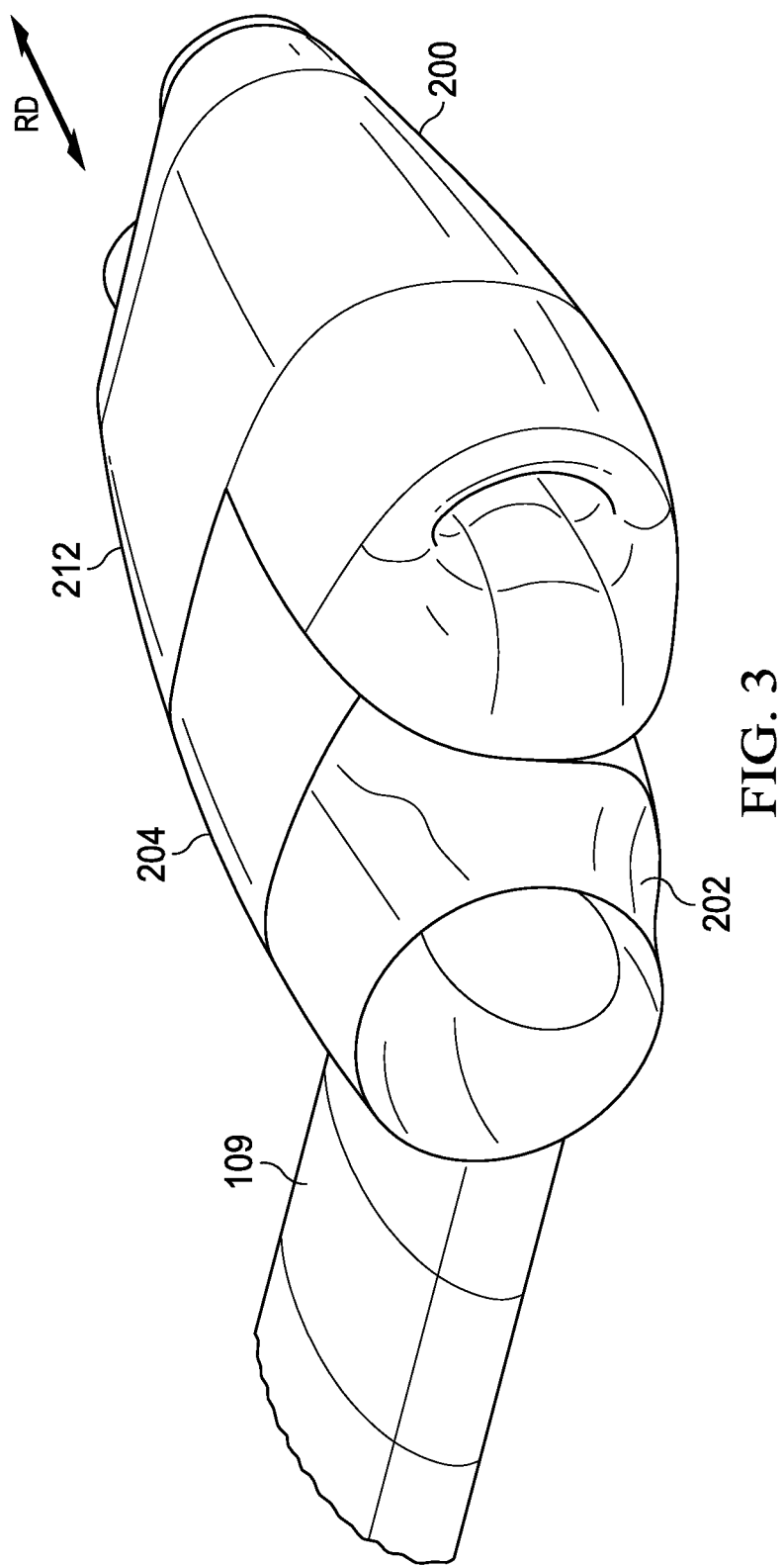
FIG. 3 is a partial perspective view of a nacelle and a PRGB door in forward flight mode, according to aspects of the disclosure.
Figure 4:
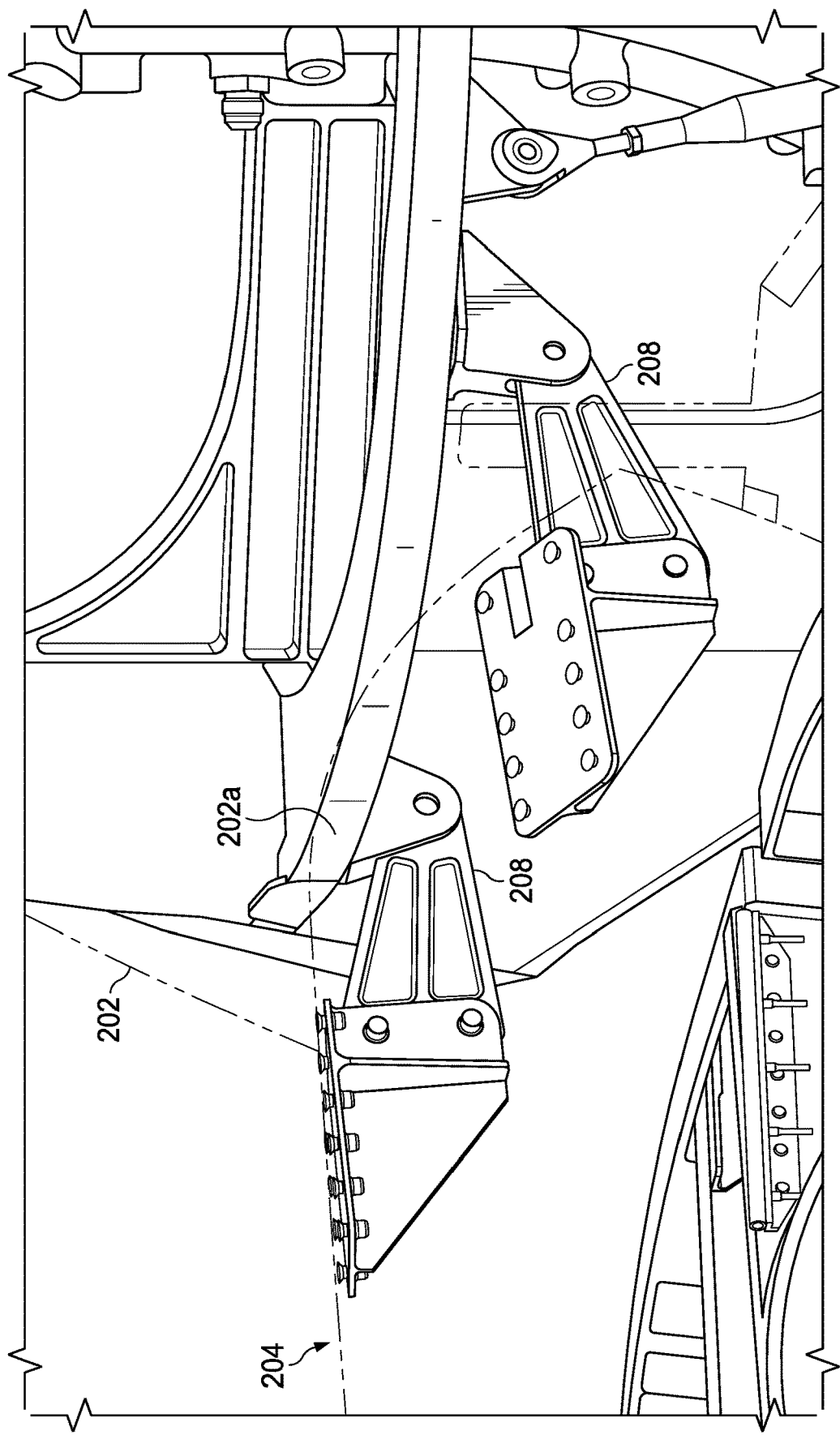
FIG. 4 is a partial view of a PRGB door and hinge fittings, according to aspects of the disclosure.
Figure 5:
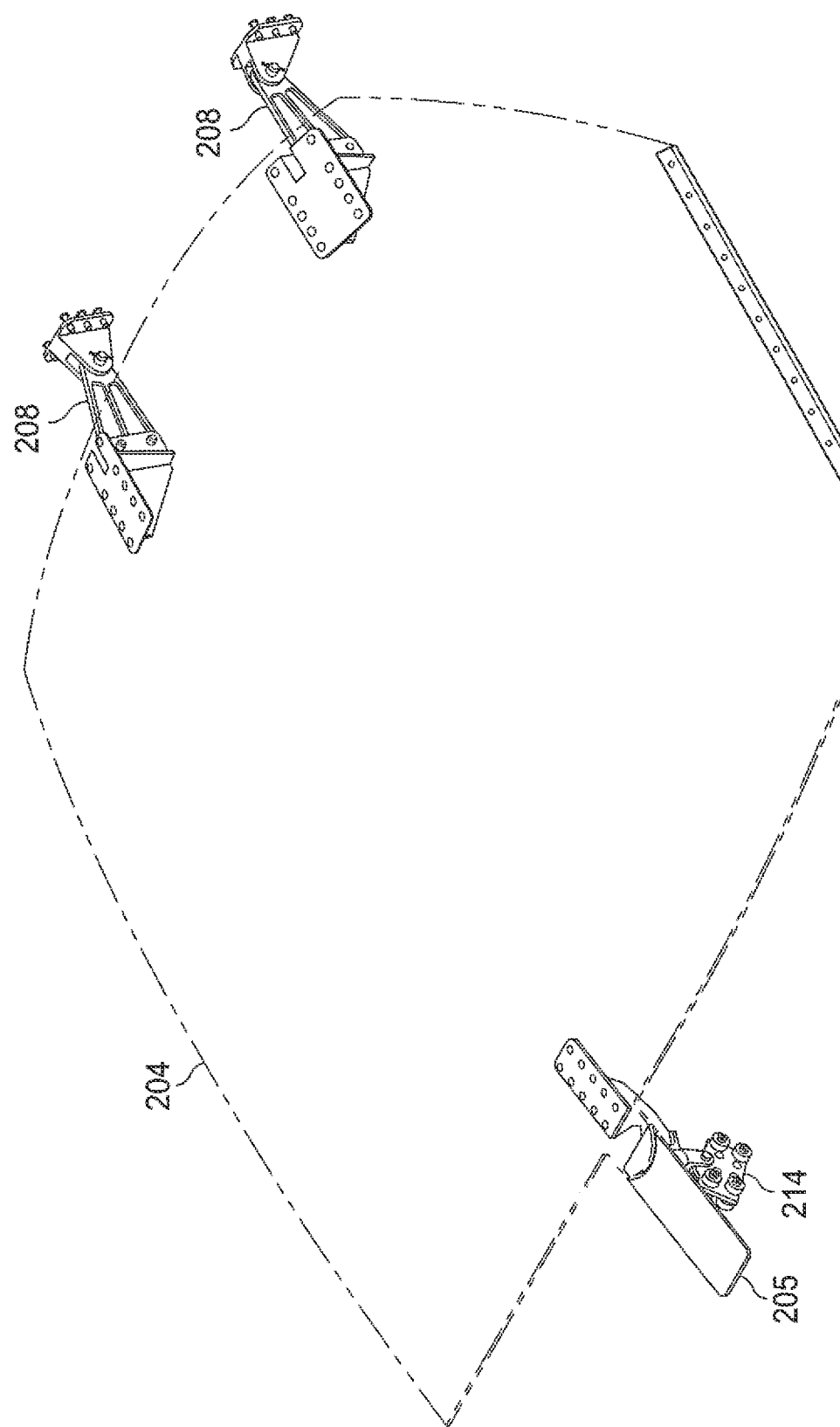
FIG. 5 is a perspective view of a PRGB door and hinge fittings for connecting to the PRGB system and with a bogie mechanism, according to aspects of the disclosure.

A PRGB door 204 is connected between fixed portion 200 and movable proprotor housing 202 (best seen in FIGS. 2 and 3). PRGB door 204 is movable in response to rotation of the movable proprotor housing 202. In the forward flight mode (e.g., FIG. 2), PRGB door 204 is closed to cover the mechanical components enclosed within fixed portion 200 of the respective nacelle 111a, 113a. In the vertical flight mode (e.g., FIG. 1), the PRGB door 204 is at least partially opened to accommodate movement (rotation) of movable proprotor housing 202. In certain exemplary aspects offered for purposes of illustration and not limitation, PRGB door 204 is connected at one end to frame 202a of the proprotor housing 202 by hinge fittings 208 (e.g., see FIGS. 4-7) or other connector mechanism that allows proprotor housing 202 to be rotated relative to fixed portion 200 of the respective nacelle 111a, 113a.

Each PRGB door 204 is connected to fixed portion 200 of the respective nacelle 111a, 113a by a roller track assembly 211 (e.g., see FIGS. 6 and 7) that includes a roller track 212 fixedly mounted externally to fixed portion 200 and a door roller 214 that rides on roller track 212. In some aspects, roller track 212 is mounted in and/or on fixed portion 200 of the respective nacelle 111a, 113a. Roller track 212 can be attached by fasteners to bulkheads and/or frames 200a of the respective nacelle 111a, 113a support structure (e.g., see FIG. 6). Roller track 212 defines a rolling direction RD (illustrated in FIGS. 3 and 6) of PRGB door 204. In response to rotation of movable proprotor housing 202 during conversion between the forward flight mode and the vertical flight mode of the aircraft, door roller 214 moves along roller track 212 in the RD direction. In some aspects, door roller 214 is connected to a structural extension 205 of PRGB door 204 (best seen in FIGS. 6 and 7) via a swivel joint 205a.

Figure 6:
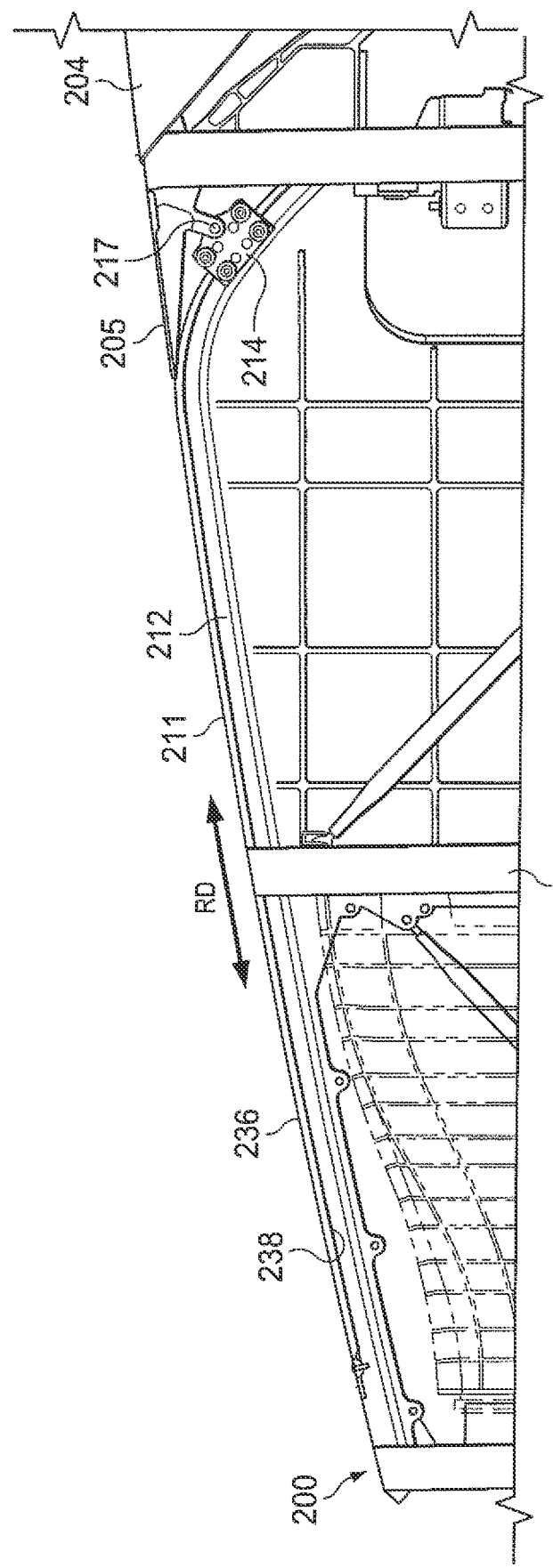
FIG. 6 is a partial elevation view of a PRGB door in the closed position for forward flight mode, according to aspects of the disclosure.
Figure 7:
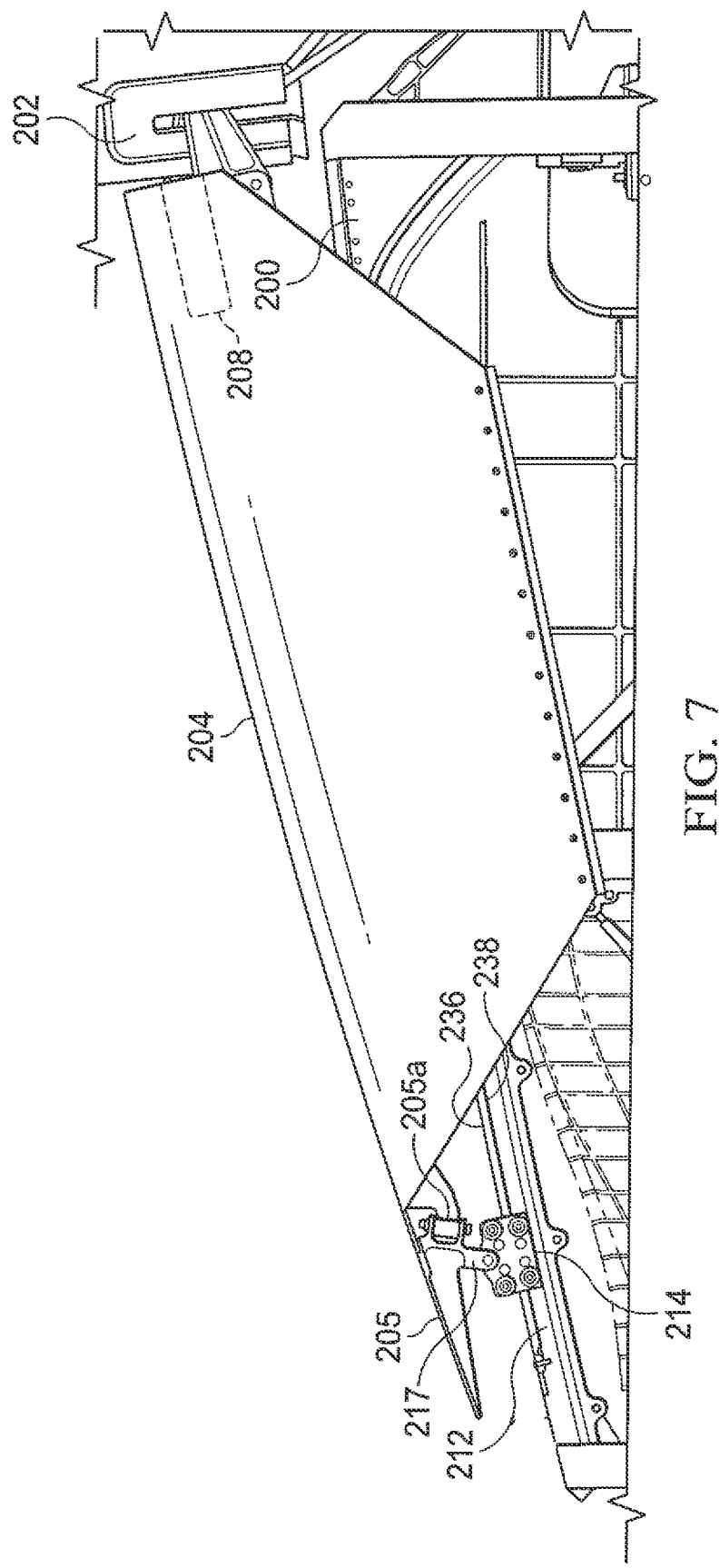
FIG. 7 is a partial elevation view of a PRGB door in the open position for vertical flight mode, according to aspects of the disclosure.
Figure 8:
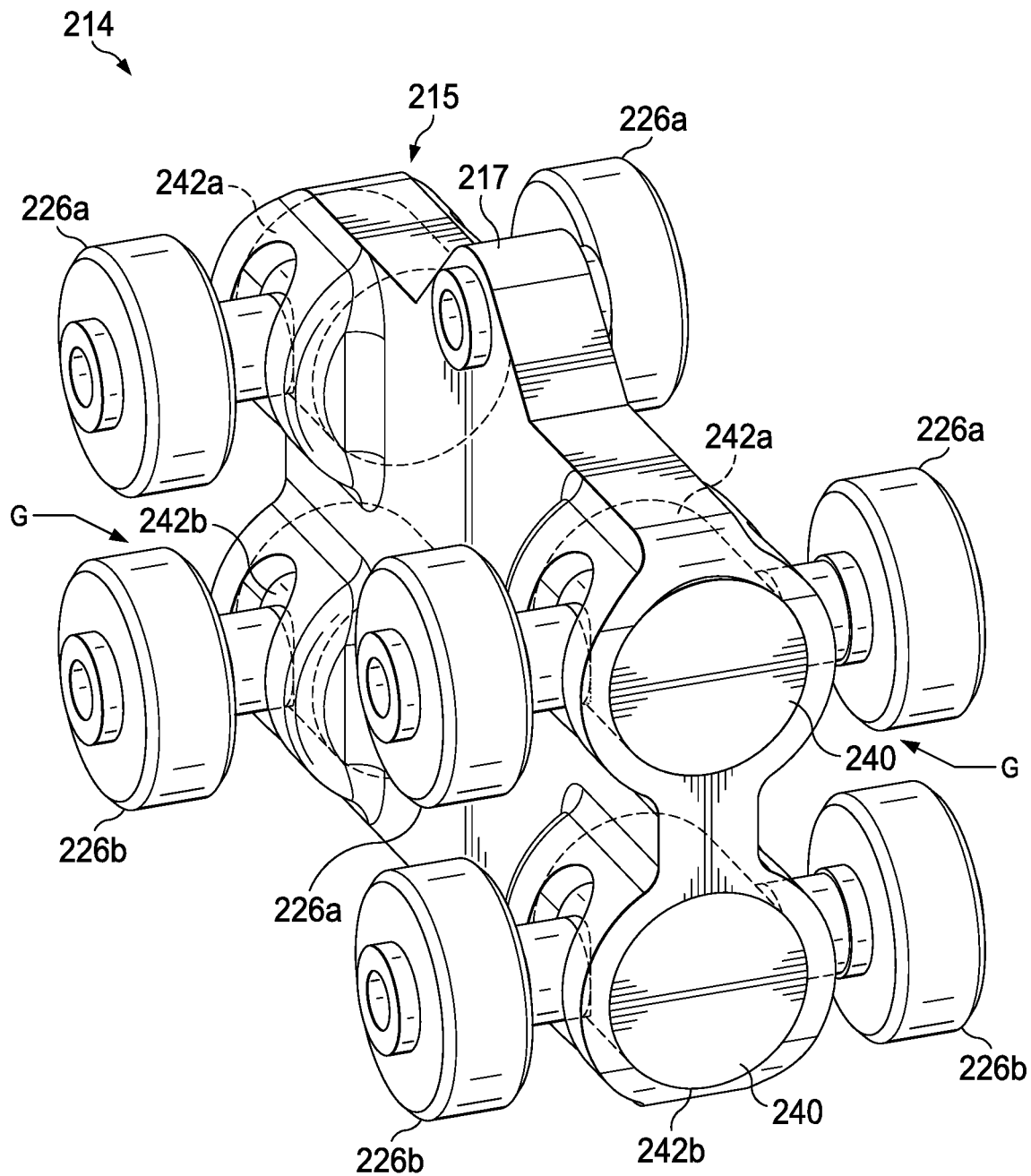
FIG. 8 is a perspective view of a door roller, according to aspects of the disclosure.
Figure 9:
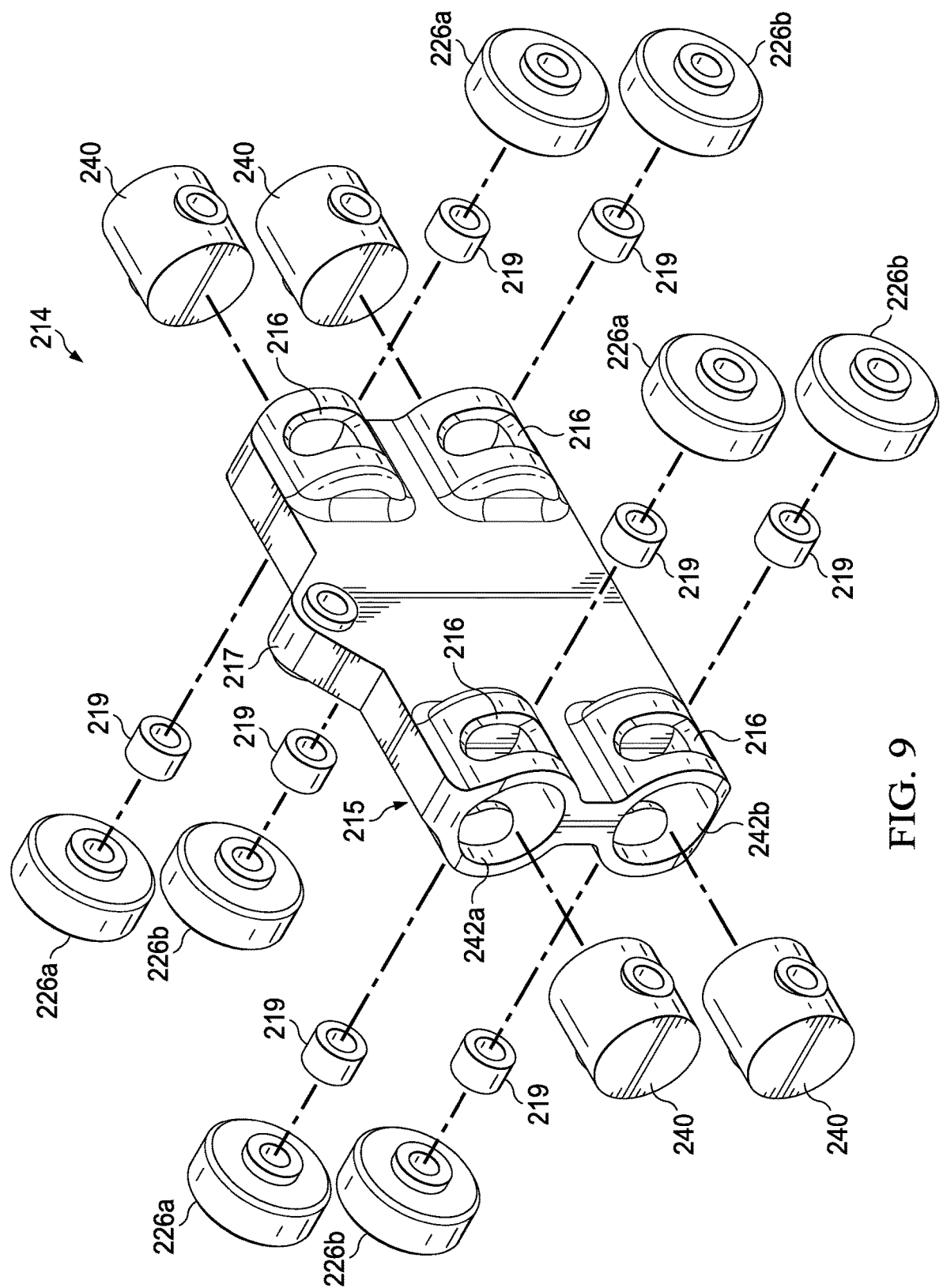
FIG. 9 is an exploded assembly of the door roller of FIG. 8, according to aspects of the disclosure.

Referring now to FIGS. 8-9, door roller 214 is illustrated according to aspects of the disclosure. FIG. 8 is a perspective view of door roller 214 and FIG. 9 is an exploded assembly of door roller 214. Door roller 214 includes a carriage member 215 to which a plurality of rollers 226a, 226b are secured. The plurality of rollers 226a roll on a topside 236 of roller track 212 and the plurality of rollers 226b roll on an underside 238 of roller track 212. In some aspects, carriage member 215 includes a door attachment feature 217 that connects door roller 214 to structural extension 205 of PRGB door 204. In FIG. 8, door attachment feature 217 is illustrated as a spherical bearing that is configured to receive a pin, bolt, or the like to attach door roller mechanism to PRGB door structural extension 205, as shown in FIGS. 6-7. In other aspects, door attachment feature 217 may comprise other known attachment mechanisms, such as a hinge, clasp, hook, and the like. In some aspects, carriage member 215 is made of corrosion resistant stainless (CRES) steel or other suitable material.

Door roller 214 includes multiple upper rollers 226a and multiple lower rollers 226b disposed on either side of side of carriage member 215. In other aspects, door roller 214 may include fewer or more rollers 226. Upper rollers 226a and lower rollers 226b are separated by a space G (see FIG. 8) that is adapted to receive respective first and second track members 218, 220 of roller track assembly 211 (described in more detail below). In certain aspects, rollers 226a, 226b are arranged in a rectangular pattern on each side of carriage member 215 as depicted in FIGS. 8-9 in order to withstand non-linear (angular directed) forces exerted on PRGB door 204 during aircraft operation. In other aspects, door roller 214 could include a plurality of rollers in various configurations (triangular, square, hexagonal patterns) that can withstand non-linear (angular directed) forces exerted on the PRGB door 204.

As illustrated in FIGS. 8 and 9, each roller 226a, 226b is rotatably mounted to a respective axle 219 so that each roller 226a, 226b may spin axially (e.g., to roll upon topside 236 and underside 238, respectively). In certain exemplary aspects, rollers 226a, 226b are made of corrosion resistant steel or other suitable material. Each axle 219 includes a first end to which one roller 226 is attached and a second end that is attached to a pivot bearing 240. Each pivot bearing 240 is positioned within a bore 242 of carriage member 215. As illustrated in FIGS. 8 and 9, carriage member 215 includes a pair of pivot bearings 240 associated with upper bores 242a and a pair of pivot bearings 240 associated with lower bores 242b. In the aspects of FIGS. 8-9, door roller 214 includes four roller assemblies, each roller assembly of which includes a pair of rollers 226. Each roller 226 is attached to one axle 219 that is connected to a pivot bearing 240. Each roller assembly is substantially similar and only a single roller assembly will be discussed with the understanding that the discussion applies to each of the four roller assemblies.

Carriage member 215 includes a plurality of slots 216 formed through walls of bores 242a, 242b, with a pair of slots 216 being associated with each roller assembly. Slots 216 are configured to permit the pair of axles 219 of a roller assembly to pass therethrough to connect to the pivot bearing 240 of that roller assembly. Slots 216 are dimensioned with a width that is slightly greater than a diameter of axles 219 and a length that is greater than the diameter of axles 219, which allows axles 219 to move along the length of slots 216 so that the roller assembly can pivot about its pivot bearing 240. The length of slots 216 determines the amount of pivot of the pivot bearings 240, and thus the amount of pivot of rollers 226 (i.e., the ends of slots 216 act as stops to limit the total amount of pivot). As illustrated in FIGS. 8-9, the pair of axles 219 of each roller assembly are coaxially aligned. In other aspects, the pair of axles 219 of a roller assembly may instead be set at an angle relative to one another. In such aspects, the surfaces of topside 236 and underside 238 are set at an angle that complements the angle of axles 219.

As illustrated in FIG. 9, each roller assembly includes two axles 219 for each roller 226. In alternative aspects, each pair of axles 219 may be replaced with a through bolt that secures one pair of rollers 226 to one pivot bearing 240. For example, the through bolt extends through, in order, a first roller 226, a pivot bearing 240, and a second roller 226. A nut may then be placed upon the end of the through bolt to secure the roller assembly to carriage member 215.

Figure 10A:
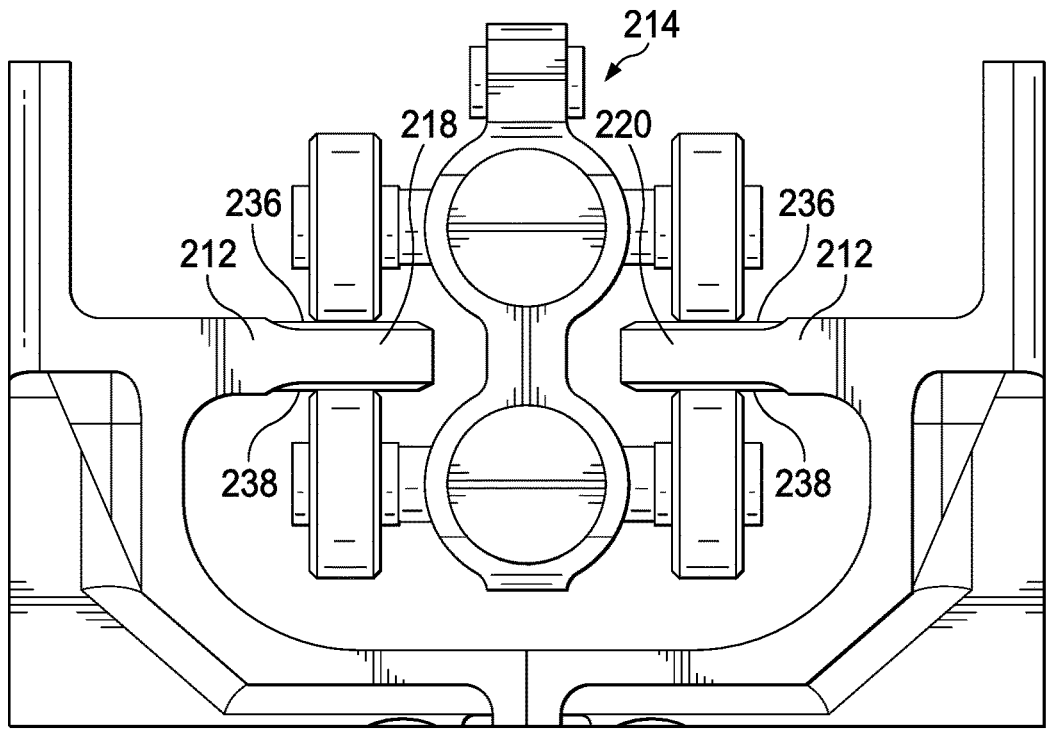
FIGS. 10A and 10B illustrate a door roller positioned within a roller track, according to aspects of the disclosure.
Figure 10B:
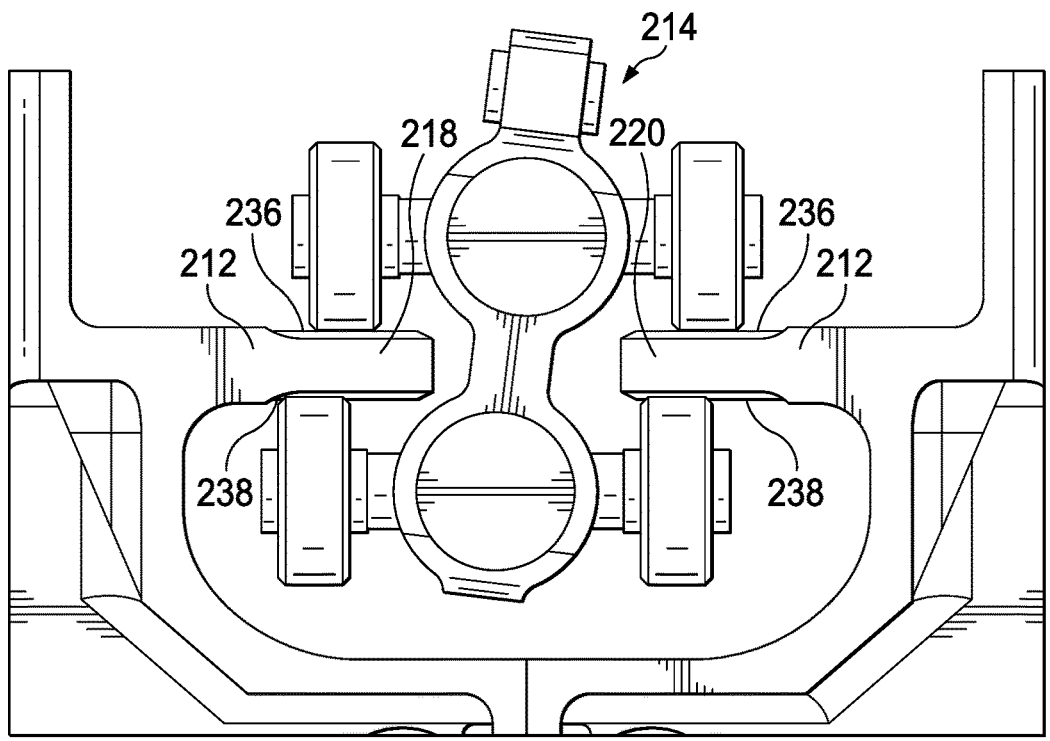

Prior designs of door rollers did not allow the rollers to pivot relative to the carriage member of the door roller. As a result, the rollers did not always roll flush upon the roller track. For example, under some loading conditions, the rollers can become misaligned and end up rolling on an edge of the roller instead of on the flat face of the roller. Repeatedly rolling the rollers upon their edges along the roller track can result in premature wear and damage to the roller track. The design of door roller 214 permits rollers 226 to pivot about carriage member 215 so that rollers 226 can maintain contact between the flat face of the roller and the roller track. For example, FIGS. 10A and 10B illustrate door roller 214 in two different orientations according to aspects of the disclosure. FIG. 10A illustrates door roller 214 in an upright position in which each roller assembly is generally perpendicular to carriage member 215. FIG. 10B illustrates door roller 214 in a canted position in which each roller assembly has pivoted relative to carriage member 215 so that rollers 226a, 226b can maintain contact with roller track 212. This pivoting action allows a central axis passing through rollers 226a, 226b to remain parallel to a face of topside 236/underside 238 of roller track 212 to maintain full contact with roller track 212, even when PRGB door 204 twists/bends during flight. Maintaining full contact between rollers 226a, 226b and roller track 212 reduces wear upon roller track 212.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A door roller comprising:
   a carriage member comprising a plurality of bores;
   a plurality of roller assemblies connected to the carriage member, each roller assembly of the plurality of roller assemblies comprising a pair of axles, a pivot bearing rotatably disposed within a bore of the plurality of bores and a pair of rollers coupled to the pivot bearing; and
   wherein the carriage member comprises a plurality of slots, each slot of the plurality of slots extend from an outer surface of the carriage member to an inner surface of the carriage member.

2. The door roller of claim 1, wherein the plurality of roller assemblies comprises an upper roller assembly configured to roll upon a topside of a roller track and a lower roller assembly configured to roll upon an underside of the roller track.

3. The door roller of claim 1, wherein:
   each bore of the carriage member is coupled to two slots of the plurality of slots; and
   each axle of the pair of axles extends through one slot of the plurality of slots.

4. The door roller of claim 1, comprising an attachment feature configured to secure the door roller to a proprotor gearbox door.

5. The door roller of claim 1, wherein the plurality of roller assemblies comprise two upper roller assemblies and two lower roller assemblies.

6. The door roller of claim 1, wherein the pivot bearings of the plurality of roller assemblies allow an axis passing through rollers of the plurality of roller assemblies to remain parallel with a face of a topside of a roller track when the carriage member pivots about the pivot bearings.

7. A door roller comprising:
a carriage member; and
a plurality of roller assemblies, each roller assembly of the plurality of roller assemblies comprising:
  a pivot bearing rotatably disposed within a bore of the carriage member;
  a pair of shafts attached to the pivot bearing at a first end of each shaft of the pair of shafts, each shaft of the pair of shafts extending through a slot formed through the carriage member;
  a roller attached to a second end of each shaft of the pair of shafts; wherein the slot extends from an outer surface of the carriage member to an inner surface of the carriage member.

8. The door roller of claim 7, wherein the plurality of roller assemblies comprise an upper roller assembly configured to roll upon a topside of a roller track and a lower roller assembly configured to roll upon an underside of the roller track.

9. The door roller of claim 7, comprising an attachment feature configured to secure the door roller to a proprotor gearbox door.

10. The door roller of claim 7, wherein the plurality of roller assemblies comprise two upper roller assemblies and two lower roller assemblies.

11. The door roller of claim 7, wherein the pivot bearing allows an axis passing through the rollers of the roller assembly to remain parallel with a face of a topside of a roller track when the carriage member pivots about the pivot bearings.

12. A proprotor aircraft comprising:
a rotatable proprotor gearbox; and
a proprotor gearbox door secured at one end of the proprotor gearbox door to a proprotor gearbox housing of the proprotor gearbox and at a second end to a roller track of the proprotor aircraft by a door roller;
wherein the door roller comprises:
  a carriage member; and
  a plurality of roller assemblies, each roller assembly of the plurality of roller assemblies comprising:
    a pivot bearing rotatably disposed within a bore of the carriage member;
    a pair of shafts attached to the pivot bearing at a first end of each shaft of the pair of shafts, each shaft of the pair of shafts extending through a slot formed through the carriage member, wherein the slot extends from an outer surface of the carriage member to an inner surface of the carriage member; and
    a roller attached to a second end of each shaft of the pair of shafts.

13. The proprotor aircraft of claim 12, wherein the plurality of roller assemblies comprise an upper roller assembly configured to roll upon a topside of a roller track and a lower roller assembly configured to roll upon an underside of the roller track.

14. The proprotor aircraft of claim 12, comprising an attachment feature configured to secure the door roller to a proprotor gearbox door.

15. The proprotor aircraft of claim 12, wherein the plurality of roller assemblies comprise two upper roller assemblies and two lower roller assemblies.

16. The proprotor aircraft of claim 12, wherein the pivot bearing allows an axis passing through the rollers of each roller assembly of the plurality of roller assemblies to remain parallel with a face of a topside of a roller track when the carriage member pivots about the pivot bearings.

17. The proprotor aircraft of claim 16, comprising an attachment feature configured to secure the door roller to a proprotor gearbox door.

18. The proprotor aircraft of claim 16, wherein the plurality of roller assemblies comprise two upper roller assemblies and two lower roller assemblies.

19. The proprotor aircraft of claim 16, wherein the plurality of roller assemblies comprise an upper roller assembly configured to roll upon the topside of the roller track and a lower roller assembly configured to roll upon an underside of the roller track.

20. The proprotor aircraft of claim 19, comprising an attachment feature configured to secure the door roller to a proprotor gearbox door.

* * * * *